United States Patent [19]

Takada et al.

[11] Patent Number: 5,163,472

[45] Date of Patent: Nov. 17, 1992

[54] FUEL PRESSURE CONTROL VALVE

[75] Inventors: Yoshio Takada, Gunma; Katsuya Shirasaki, Kiryu, both of Japan

[73] Assignee: Mitsuba Electric Manufacturing Co., Ltd., Gunma, Japan

[21] Appl. No.: 855,736

[22] Filed: Mar. 20, 1992

[30] Foreign Application Priority Data

Mar. 25, 1991 [JP] Japan .................. 3-25713[U]

[51] Int. Cl.⁵ ............................................ F16K 27/02
[52] U.S. Cl. ................................. 137/507; 123/447; 123/457; 137/510; 251/151
[58] Field of Search ............ 137/507, 510, 315; 123/447, 456, 457, 463, 467; 251/143, 148, 151

[56] References Cited

U.S. PATENT DOCUMENTS

| | | | |
|---|---|---|---|
| 2,720,891 | 10/1955 | Glasgow | 137/510 |
| 2,813,542 | 11/1957 | Hughes | 137/507 X |
| 3,751,002 | 8/1973 | Folkerts et al. | 251/148 |
| 4,465,092 | 8/1984 | Vitale | 251/148 X |
| 4,590,960 | 5/1986 | Koble | 251/148 X |
| 4,633,901 | 1/1987 | Brandt et al. | 137/510 |
| 4,646,700 | 3/1987 | Tuckey | 137/510 X |
| 4,653,528 | 3/1987 | Field et al. | 137/510 X |
| 4,936,342 | 6/1990 | Kojima et al. | 137/510 |

*Primary Examiner*—Stephen M. Hepperle
*Attorney, Agent, or Firm*—McGlew and Tuttle

[57] ABSTRACT

A fuel pressure control valve wherein a pipe press-fit opening 15a is formed on a housing 11 constituting a control valve chamber 16 together with a diaphragm 12, a mounting flange 26 is projectedly provided on the outer surface of this housing 11 and a return pipe 17 is press-fitted into a pipe press-fit opening 15a. A boss portion 33 is expandedly provided at a rear surface of the housing 11, which is opposite to the mounting flange 26, and seat surfaces 32 and 34 for receiving a jig during press-fitting of the return pipe 17 into the pipe press-fit opening are formed at end faces of the mounting flange 26 and the boss portion 37, in a flat plate shape and in a parallel alignment between one end face with the other.

6 Claims, 3 Drawing Sheets

1

FUEL PRESSURE CONTROL VALVE

BACKGROUND OF THE INVENTION

1. Field of the Invention

This invention relates to a fuel pressure control valve, and more particularly to improvements in assembling construction of this fuel pressure control valve and in connecting construction of outer paths, and, for example, to a fuel pressure control valve effective when it is utilized for controlling a fuel supply amount in accordance with the fuel pressure.

2. Description of the Prior Art

In general, in a vehicle such as a motor vehicle, there has been used a fuel pressure control valve provided with a housing produced by die casting in a fuel supply path for supplying the fuel in a fuel tank to an engine.

Most of the above-described housing in the fuel pressure control valve is integrally formed through die casting with a mounting flange for mounting this fuel pressure control valve onto a machine frame and the like and with a pipe press-fit opening for connecting a pipe or the like as being a fuel path to this fuel pressure control valve, and further, the mounting flange is integrally provided with a cylindrical joint portion projecting in a direction substantially perpendicular to the mounting flange.

In the above-described fuel pressure control valve, it becomes necessary to press-fit a return pipe into the pipe press-fit opening communicated with a control valve chamber. However, since a process of press-fitting this return pipe into the housing is performed prior to a swaging process of fixing a case for housing a diaphragm to the housing, if the type of the car and the specification are changed, whereby the direction and length of the return pipe is varied, commonnizing of the processes including the process of swaging the case to the housing cannot be held.

Incidentally, it is conceivable that, after the process of swaging the case to the housing is performed, a method of press-fitting the return pipe into the housing through supporting the case by the swaged portion. However, with this method of assembling, there is such a danger that stress acts on the diaphragm and the like during press-fitting of the return pipe into the pipe press-fit opening of the housing, so that a set pressure may be fluctuated.

SUMMARY OF THE INVENTION

An object of the present invention is to provide a fuel pressure control valve capable of press-fitting a pipe into a pipe press-fit opening without fluctuations of the set pressure even after a case for housing a diaphragm is fixed to a housing.

The fuel pressure control valve according to the present invention, wherein a pipe press-fit opening communicated with a control valve chamber is formed on the housing constituting the control valve chamber together with the diaphragm, a mounting flange is integrally and projectedly provided on the outer surface of this housing, and a cylindrical joint portion is integrally provided on this mounting flange projecting in a direction substantially perpendicular to said mounting flange, is characterized in that a boss portion is expandedly provided on the rear surface of the housing opposite to the mounting flange, and seat surface are formed respectively at end faces of the mounting flange and the boss portion on the sides of the diaphragm, in planes substantially perpendicular to the axis of the pipe press-fit opening so that said seat surfaces are substantially parallel with each other.

By the above-described means, the respective seat surfaces formed at the end faces of the mounting flange and the boss portion, which are on the side of the diaphragm, can be used as the seat surfaces during the press-fitting the pipe, even if the pipe is press-fitted into the pipe press-fit opening after the case is fixed to the housing, the stress can be restrained from acting on the diaphragm and the like during press-fitting the pipe. For this purpose, the pipe can be press-fitted irrespective of the direction and the length of the pipe even after the process of swaging the case is carried out.

BRIEF DESCRIPTION OF THE DRAWINGS

The above and other objects and features of the present invention will become more apparent when referred to the following descriptions given in conjuction with the accompanying drawings, wherein like reference numerals denote like elements, and in which.

DETAILED DESCRIPTION OF THE PREFERRED EMBODIMENTS

Figure 1:
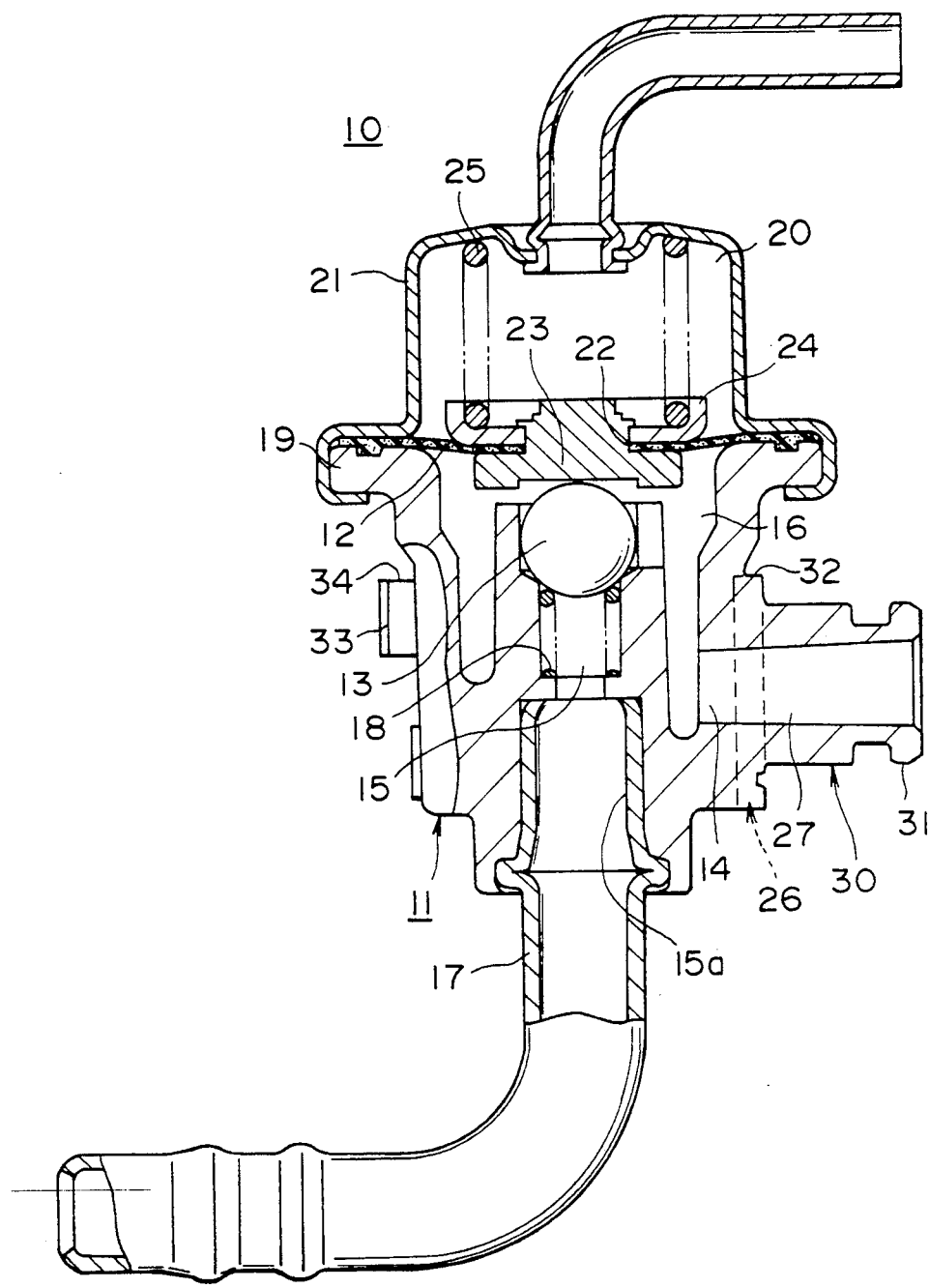
FIG. 1 is a side sectional view showing one embodiment of the fuel pressure control valve according to the present invention.

Referring to the drawings, a fuel pressure control valve 10 in this embodiment comprises: a housing 11 produced by die casting, a diaphragm 12 and a spherical valve body 13. The housing 11 is opened therein with a fuel introduction path 14 and a fuel discharge path 15, and a control valve chamber 16 is formed between the both paths 14 and 15. A pipe press-fit opening 15a is formed on the side of an output of the fuel discharge path 15, and a return pipe 17 connected to a fuel tank, not shown, is pressed into this pipe press-fit opening 15a. Then, a coil spring 18 is coupled onto the intermediate portion of the fuel discharge path 15, and the valve body 13 is mounted into the inlet side of the fuel discharge path 15. The coil spring 18 is constantly urging the valve body 13 toward the diaphragm 12.

The diaphragm 12 defines a part of a wall surface of the control valve chamber 16 and is solidly fixed to a flange portion 19 of the housing 11 together with a case 21 constituting an atmospheric chamber 20. A holding hole 22 is opened at the central portion of this diaphragm 12, and a pole 23 is mounted into the holding hole 22. One end of the pole 23 is abutted against the valve body 13 and the other end of the pole 23 is solidly fixed to a support plate 24 abutted against the diaphragm 12. A coil spring 25 is interposed between the support plate 24 and an end wall surface of the case 21, whereby the diaphragm 12 is constantly urged by the urging force of the coil spring 25 toward the valve body 13, so that the valve body 13 is pressed by the urging force of the coil spring 25 to block the inlet of the fuel discharge path 15.

Then, when the fuel is supplied into the control valve chamber 16 to raise the pressure in the control valve chamber 16, the diaphragm 12 moves toward the atmospheric chamber 20 against the urging force of the coil spring 25. At this time, the valve body 13 is moved toward the diaphragm 12 by the urging force of the coil spring 18, whereby the inlet side of the fuel discharge path is opened. Namely, the fuel introduction path 14 and the fuel discharge path 15 are communicated with each other through the control valve chamber 16.

Figure 2:
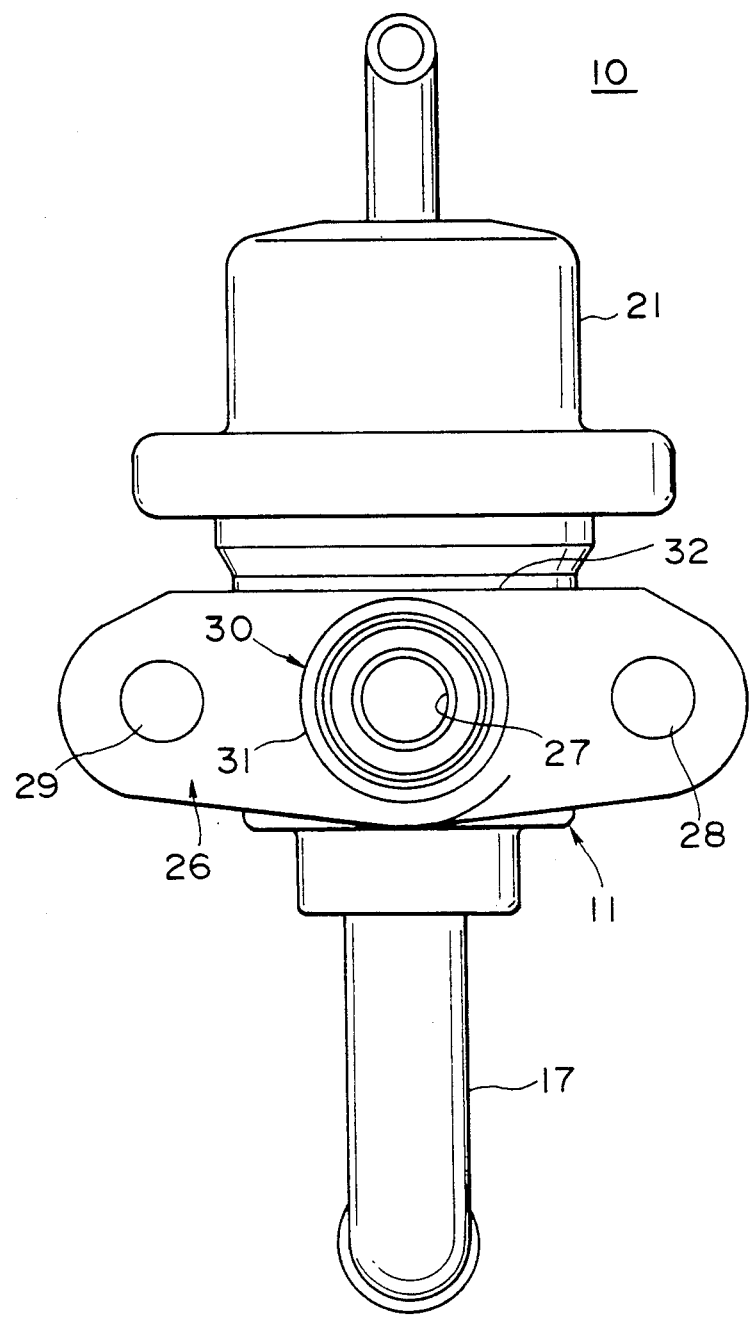
FIG. 2 is a front view thereof.
Figure 3:
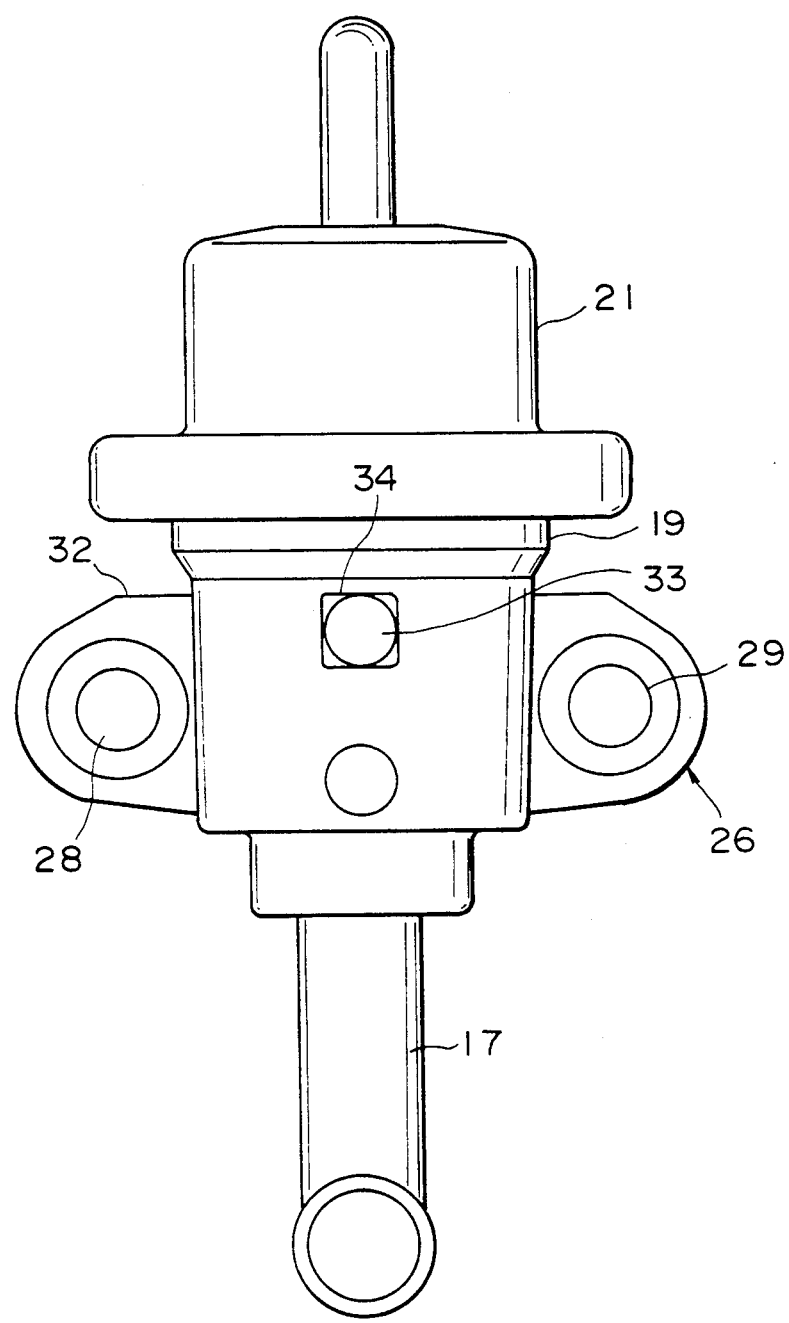
FIG. 3 is a rear view thereof.

On the other hand, a mounting flange 26 for mounting this fuel pressure control valve 10 to a machine frame and the like is integrally formed by die casting on the outer portion of the housing 11. This mounting flange 26 is disposed on the outer portion of the fuel introduction path 14 and is integrally and projectedly provided therewith. This mounting flange 26 is formed to provide a substantially oval flat plate shape and projectedly provided in such a manner to perpendicularly intersect the center line of the fuel introduction path 14 and in bilateral symmetry. A through-hole 27 substantially constituting the fuel introduction path 14 is opened in the central portion of the mounting flange 26, and mounting holes 28, 29, as shown in FIG. 2, are respectively opened at both sides of the through-hole 27 of the mounting flange 26. A connecting opening portion 30 is cylindrically and integrally formed in such a manner to be projected in a direction perpendicular to this mounting flange 26 at an edge of the through-hole 27 of the mounting flange 26. A retainer ring portion 31 for coupling a seal ring, not shown, is integrally formed at the forward end portion of this connecting opening portion 30.

A first seat surface 32 is formed in a planar shape and in such a manner to substantially perpendicularly intersect the axis of the pipe press-fit opening 15a at the end face of the mounting flange 26 on the side of the diaphragm. Furthermore, a boss portion 33 is expandedly formed on the rear surface of the housing 11 on the side opposite to the mounting flange 26. A second seat surface 34 is formed on the end face of the boss portion 33 on the side of the diaphragm in a planar shape and in such a manner to substantially perpendicularly intersect the axis of the pipe press-fit opening 15a similarly to the first seat surface 32 of the mounting flange 26 whereby these first and second seat surfaces 32, 34 are parallel. Further, in this embodiment, these first and second seat surfaces are formed to constitute substantially coplanar surfaces with each other.

Prescription will hereunder be given of the works of assembling the case 21 and the return pipe 17 to the housing 11.

First, the case 21 housing therein the diaphragm 12 is mounted to the flange portion 19 of the housing 11, and the end portion of the case 21 on the side of the opening is swaged radially and inwardly, so that the case 21 is fixed to the flange portion 19 of the housing 11.

Thereafter, a suitable jig, not shown, is applied to the first seat surface 32 of the mounting flange 26 and to the second seat surface 34 of the boss portion 33, whereby the return pipe 17 is press-fitted into the pipe press-fit opening 15a of the housing 11. At this time, the stress due to the press-fitting acts on the jig through the first and second seat surfaces 32 and 34, so that the stress during the press-fitting of the return pipe 17 can be prevented from acting on the diaphragm 12 and the like.

Accordingly, even when the return pipe 17 is press-fitted into the pipe press-fit opening 15a of the housing 11 after the case 21 is fixed to the flange portion 19 of the housing, the setting pressure for the diaphragm 12 can be prevented from being fluctuated.

Furthermore, the work of press-fitting the return pipe 17 can be carried out after the case 21 is fixed, so that, even when the direction and length of the return pipe 17 are varied because of the changes in the type of vehicle and the specification, the works up to the process of swaging the case 21 can be commonized irrespective of the conditions of the return pipe 17.

As has been described hereinabove, according to the present invention, the seat surfaces are formed respectively at the end faces of the flange portion and the boss portion, so that the work of press-fitting the pipe into the press-fit opening of the housing can be carried out after the case is fixed to the housing, and the processes up to fixing the case to the housing can be commonized irrespective of the conditions of any pipe to be press-fitted into.

The present invention is not limited to the above embodiment, and, needless to say that various modifications can be achieved within the scope not departing from the gist of the present invention.

What is claimed is:

1. A fuel pressure control valve, comprising:
   a pipe press-fit opening communicated with a control valve chamber, which is formed on a housing constituting said control valve chamber together with a diaphragm;
   a mounting flange integrally and projectedly provided on the outer surface of said housing;
   a cylindrical joint portion projectedly provided on said mounting flange, projecting in a direction substantially perpendicular to said mounting flange;
   a boss portion expandedly provided at a rear surface of said housing, which is opposite to said mounting flange; and
   seat surfaces formed respectively at end faces of said mounting flange and said boss portion on the sides of said diaphragm, in planes substantially perpendicular to the axis of said pipe press-fit opening so that said seat surfaces are substantially parallel with each other.

2. A fuel pressure control valve as set forth in claim 1, wherein said housing is produced by die casting.

3. A fuel pressure control valve as set forth in claim 1, wherein a valve body is mounted into an inlet portion of a fuel discharge path in said control valve chamber and said valve body is urged toward said diaphragm by a first coil spring.

4. A fuel pressure control valve as set forth in claim 3, wherein a pole is provided at the substantially central portion of said diaphragm, one end of said pole is abutted against said valve body and the other end thereof is urged toward said valve body by a second coil spring interposed between a case fixed to an end face of said housing and said pole.

5. A fuel pressure control valve as set forth in claim 4, wherein said diaphragm is fixed to an end face of said housing, and said diaphragm, said pole and said case constitute an atmospheric chamber communicated with atmosphere.

6. A fuel pressure control valve as set forth in claim 1, wherein each of said seat surfaces forms an abutment surface to which a jig is applied when a fuel return pipe is press-fitted into said pipe press-fit opening.

* * * * *